(12) United States Patent
Leino et al.

(10) Patent No.: US 10,012,024 B2
(45) Date of Patent: Jul. 3, 2018

(54) CONTROL VALVE

(71) Applicant: SANDVIK MINING AND CONSTRUCTION OY, Tampere (FI)

(72) Inventors: Timo Leino, Tampere (FI); Timo Muuttonen, Tampere (FI); Antti Koskimaki, Tampere (FI); Ari Kotala, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 280 days.

(21) Appl. No.: 14/789,030

(22) Filed: Jul. 1, 2015

(65) Prior Publication Data

US 2016/0003372 A1 Jan. 7, 2016

(30) Foreign Application Priority Data

Jul. 3, 2014 (EP) .................................... 14175564

(51) Int. Cl.
| | |
|---|---|
| *E21B 4/14* | (2006.01) |
| *E21B 21/08* | (2006.01) |
| *E21B 21/10* | (2006.01) |
| *F16K 31/12* | (2006.01) |
| *F16K 47/04* | (2006.01) |
| *E21B 4/06* | (2006.01) |

(52) U.S. Cl.
CPC ................. *E21B 4/14* (2013.01); *E21B 4/06* (2013.01); *E21B 21/08* (2013.01); *E21B 21/103* (2013.01); *F16K 31/12* (2013.01); *F16K 47/04* (2013.01)

(58) Field of Classification Search
CPC ........................................................ E21B 4/14
See application file for complete search history.

(56) References Cited

U.S. PATENT DOCUMENTS

| | | | |
|---|---|---|---|
| 2,951,467 A | | 9/1960 | Morrison |
| 3,125,297 A | * | 3/1964 | Copeland et al. ........ B05B 3/06 239/251 |
| 4,913,243 A | | 4/1990 | Jenne et al. |
| 5,029,657 A | * | 7/1991 | Mahar ..................... E21B 10/56 175/393 |

(Continued)

FOREIGN PATENT DOCUMENTS

| | | |
|---|---|---|
| GB | 2213179 | 8/1989 |
| JP | 2013139865 | 7/2013 |

(Continued)

OTHER PUBLICATIONS

Dictionary definition of "valve", accessed Oct. 2, 2017 via www.collinsdictionary.com.*

*Primary Examiner* — Blake E Michener
(74) *Attorney, Agent, or Firm* — Corinne R. Gorski

(57) ABSTRACT

A control valve for controlling flow of a pressure fluid in a breaking device includes a sleeve-like control valve having at least one opening enabling flow of the pressure fluid through the opening. The at least one opening includes at least one wall, at least a part of which is not arranged in a direction parallel to a radial direction of the control valve extending through the middle point of the cross section of the opening on the outer circumference of the control valve, such that the pressure fluid flowing through the opening may be arranged to rotate the control valve about the longitudinal axis of the control valve.

12 Claims, 3 Drawing Sheets

(56) References Cited

U.S. PATENT DOCUMENTS

| | | | |
|---|---|---|---|
| 5,803,187 A * | 9/1998 | Javins | E21B 4/02 |
| | | | 175/296 |
| 7,686,102 B2 * | 3/2010 | Swinford | E21B 4/02 |
| | | | 175/107 |
| 9,038,744 B2 * | 5/2015 | Swinford | E21B 4/14 |
| | | | 173/200 |
| 2010/0078219 A1 | 4/2010 | Swinford | |
| 2012/0247757 A1 | 10/2012 | Swinford | |
| 2014/0360743 A1 * | 12/2014 | Muuttonen | F16H 57/0456 |
| | | | 173/1 |

FOREIGN PATENT DOCUMENTS

| KR | 20040071190 A | 8/2004 |
|---|---|---|
| WO | 2010109071 | 9/2010 |

\* cited by examiner

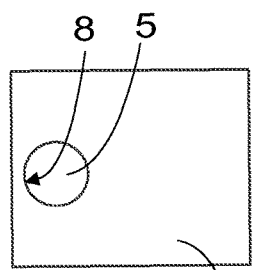
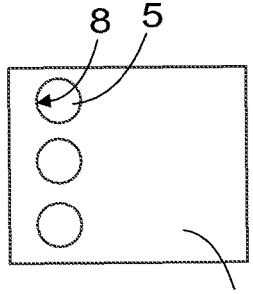
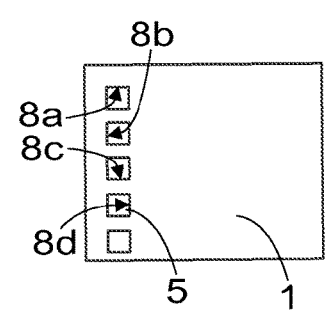
FIG. 4a   FIG. 4b   FIG. 4c
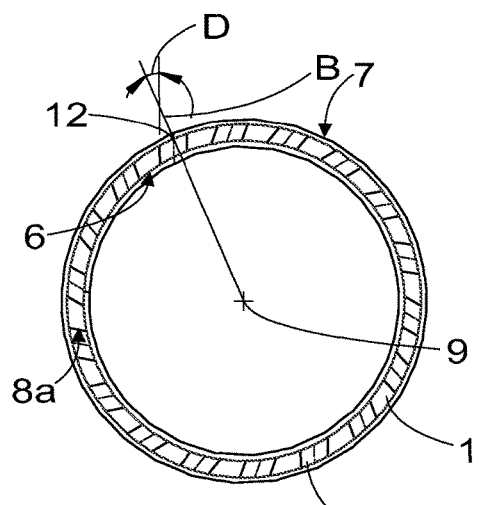
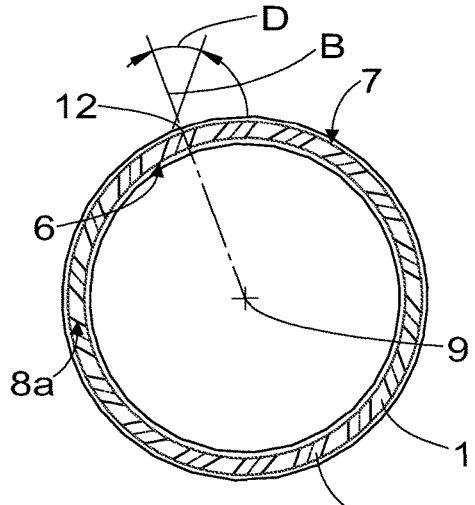
FIG. 5a   FIG. 5b
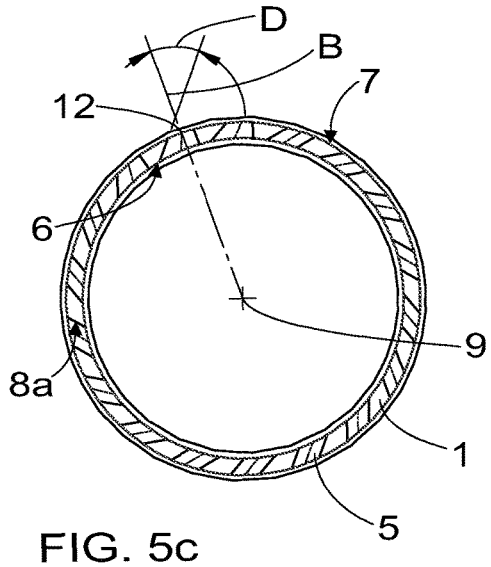
FIG. 5c

CONTROL VALVE

RELATED APPLICATION DATA

This application claims priority under 35 U.S.C. § 119 to EP Patent Application No. 14175564.5, filed on Jul. 3, 2014, which the entirety thereof is incorporated herein by reference.

TECHNICAL FIELD

The present disclosure relates to breaking devices, such as rock drilling machines and/or breaking hammers, and more particularly to control valves controlling flow of a pressure fluid in a breaking device.

BACKGROUND

Control valves are used in hydraulic systems of mining machines for example for controlling flow of pressure fluid. One type of such a control valve is a sleeve-like valve comprising at least one opening all the way through the wall of the control valve, and provided in the work chamber of the percussion piston in such a way that the position of the percussion piston affects the flow of the pressure fluid through the at least one opening. When such opening enables or disables the flow of the pressure fluid to a discharge channel and to a tank, cavitation damages may occur on the inner surface of the sleeve-like valve on the side opposite to the opening through which the pressure fluid flows. Additionally, cavitation may cause chipping of the control valve and these metal chips may cause damages in the hydraulic system, such as seizing of parts and components.

SUMMARY

An aspect of the present disclosure is to provide a new and improved control valve and breaking device.

The present disclosure is based on the idea of forming the opening(s) through which the pressure fluid flows in such a way that the pressure fluid flowing through the opening(s) causes the control valve to rotate.

Due to the rotation of the valve, possible cavitation damages are not directed to a single, limited area of the inner surface of the sleeve-like valve only. This may increase the durability of the control valve and, thus, extend its service life and the life cycle of the control valve considerably.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIGS. 4a, 4b and 4c are side view details of a control valve.

FIGS. 5a, 5b and 5c are cross-sectional views of different embodiments of the control valve taken along line A-A of FIGS. 1 and 2.

FIG. 6b is a cross-section of a control valve taken along line C-C of FIG. 6a.

DETAILED DESCRIPTION

Figure 1:
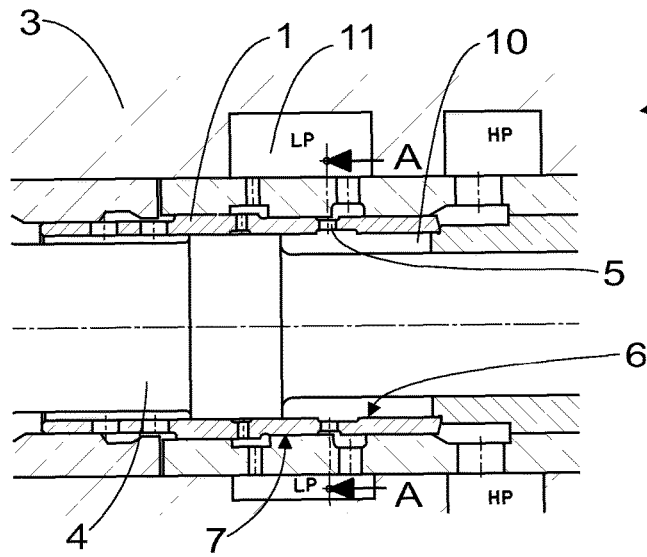
FIG. 1 is a partial cross-sectional detail of a breaking device.

FIG. 1 illustrates schematically a detail of a breaking device 2, more particularly a rock drilling machine, shown in partial cross-section. The breaking device 2 of FIG. 1 includes a frame 3, a percussion piston 4 and a sleeve-like control valve 1 arranged around the percussion piston 4. The control valve 1 has at least one opening 5 extending from an inner surface 6 of the control valve to an outer surface 7 of the control valve, enabling flow of the pressure fluid between the inside of the control valve and the outside of the control valve through the opening 5.

The control valve 1 and the opening 5 may be positioned and formed in such a way that flow of the pressure fluid through the opening 5 is enabled during at least a first phase of the percussion piston 4 work cycle, in other words, when percussion piston 4 is in a first position, and disabled during at least a second phase of the percussion piston 4 work cycle, in other words, when the percussion piston 4 is in a second position.

Figure 2:
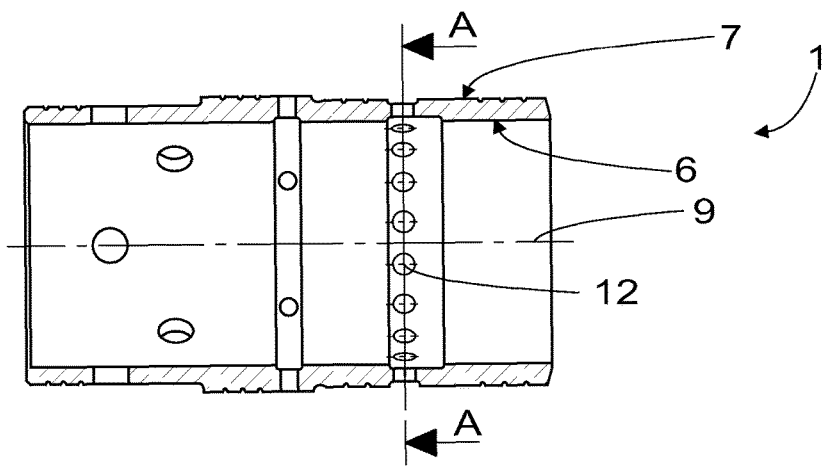
FIG. 2 illustrates schematically a control valve.

FIG. 2 illustrates schematically an example of such a control valve 1 in cross-section in the longitudinal direction of the control valve 1, or in other words, as shown from a side in cross-section. The control valve 1, thus, has a sleeve-like form having outer surface 7, inner surface 6 and at least one opening 5. The control valve 1 in FIG. 2 includes a plurality of openings 5. Such control valves 1, i.e., those provided with opening(s) 5 and wall(s) 8, 8a, 8b, 8c, 8d surrounding the opening(s), the walls having a direction that is parallel to a substantially radial direction in relation to a longitudinal axis 9 of the control valve and extending through the middle axis of the opening, are known in the art. Such control valves tend to be positioned in a stable position within the frame 3 in the rotational direction and therefore, when the opening(s) 5 are arranged to enable or disable the flow of the pressure fluid to a discharge channel and to a tank, pressure changes and the flow of the pressure medium may cause cavitation damages, such as material being peeled from the inner surface 6 of the control valve 1. This may then cause the back-side sealing of the control valve 1 to leak and chipping of the material, which may cause blockages and other damages in structural parts of the breaking device 2.

Due to the stable position of the control valve 1 and the uneven distribution of the pressure and the flow, these damages tend to affect a substantially point-like or otherwise limited area on the inner surface 6. In an embodiment similar to that of FIG. 1, for example, the damages tend to affect the area of the inner surface 6 furthest away from the low pressure tank.

The concentration of the cavitation effects on a small area of the inner surface 6 of the control valve 1 may be avoided by providing a control valve 1, wherein the at least one opening 5 has at least one wall 8, 8a, 8c at least a part of which is not arranged in a direction parallel to a radial direction of the control valve 1 extending through the middle point 12 of the opening 5 on the outer circumference of the control valve 1, and wherein the cross-sectional area of the opening 5 on the inner surface 6 is substantially equal to or larger than the cross-sectional area of the opening 5 on the outer surface 7 of the control valve, such that the pressure fluid flowing through the opening may be arranged to rotate the control valve about the longitudinal axis of the control valve.

The control valve may be arranged to rotate by the flowing pressure fluid, by the part of the wall forming a surface area when projected in the tangential direction of the control valve 1, more particularly, in the tangential direction of the longitudinal axis 9 of the control valve.

A direction parallel to a radial direction of the control valve 1 extending through the middle point 12 of the cross-section of the opening 5 on the outer circumference of the control valve 1 refers to the direction of walls of an opening drilled or otherwise machined through the sleeve-like control valve 1 from the outer surface 7 towards the longitudinal axis 9 of the control valve 1, in other words, in the radial direction of the control valve 1.

An example of such an opening is a normal borehole drilled in a radial direction of the control valve 1. A characteristic of such a conventional opening is that each part of each wall has a counter part of counter wall that cancels out a possible rotating force that would otherwise be created by the direction of the wall, when pressure fluid flows through the opening.

In the solution described in this disclosure, however, at least one opening 5 has at least one wall, such as a wall 8, 8a, 8c, at least a part of which is not parallel to such direction, thus creating a force that moves the control valve 1 in a rotating direction when pressure medium flows through the opening 5. Being not parallel means that the wall 8, 8a, 8c that is not parallel may be, for instance tilted or arranged at an angle related to the radial direction extending through the middle point 12 of the cross section of the opening on the outer circumference of the control valve or the wall 8, 8a, 8c may have a step-like form, for example.

Figures 3A, 3B, 3C:
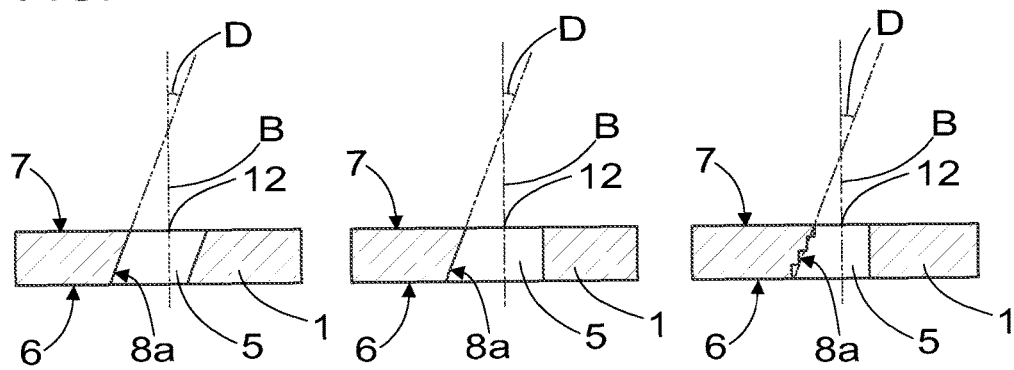
FIGS. 3a, 3b and 3c are cross-sectional details of control valves.

Some embodiments of such openings 5 are illustrated schematically in FIGS. 3a to 3b. When the pressure medium flows through such an opening 5, it creates a force that rotates the control valve. Preferably, the walls 8, 8a, 8b, 8c, 8d of the opening 5 are formed in such a way that the control valve 1 rotates in the same direction as the percussion piston 4, as in such an embodiment also the rotation of the percussion piston 4 supports the rotation of the control valve 1 as well.

FIG. 3a illustrates schematically in cross-section a detail of a control valve 1, more particularly a part of the cross section on control valve 1 in direction of line A-A of FIGS. 1 and 2, for example, wherein a wall 8a that is not arranged in a direction parallel to a radial direction B of the control valve 1 (more particularly radial to the longitudinal axis 9 of the control valve 1) extending through the middle point 12 of the cross-section of the opening 5 on the outer circumference of the control valve 1 is arranged at an angle D in relation to the direction parallel to the radial direction B of the control valve 1. Although the control valve 1 has a sleeve-like construction and a substantially circular cross-section, a detail of the control valve 1 and the principle of the openings is illustrated in FIGS. 3a to 3c by a rectangular area for the sake of clarity.

According to an embodiment, the angle D may be between 5 degrees and 60 degrees. A most suitable angle D may depend on the characteristics of the breaking device 2 the control valve 1 is intended for, for example. The characteristics may be for instance clearances, friction, flow rate and masses, for example.

In an embodiment similar to FIG. 3a, all the walls 8, 8a, 8b, 8c, 8d or, in case of for instance a round or elliptical opening 5, the single wall 8, may be provided at substantially in the same angle, i.e. in the same direction. FIG. 3b, on the other hand, illustrates in a similar manner an embodiment, where only one wall 8a or a part of a wall 8, 8a, 8c or some of the walls 8, 8a, 8c is arranged at an angle D in relation to the radial direction B of the control valve 1 extending through the middle point 12 of the cross-section of the opening 5 on the outer circumference of the control valve 1.

FIG. 3c illustrates yet another embodiment, wherein the wall 8a at least a part of which is not arranged in a direction parallel to a radial direction of the control valve extending through the middle point 12 of the cross section of the opening 5 on the outer circumference of the control valve 1 have a step-like shape. Such a wall 8a having a step-like shape may also be considered to be arranged at an angle D in relation to the radial direction B of the control valve 1 if the direction of the wall 8a having the step-like shape is defined by the end points of the wall 8a on the outer surface 7 and on the inner surface 6 of the control valve 1, or the direction of the wall 8a is defined by the inner or outer points of each step of the wall 8a.

FIGS. 4a, 4b and 4c illustrate schematically in a side view details of a control valve 1. FIGS. 4a, 4b and 4c are simplified to illustrate some principles of the solutions only, and although the control valve 1 has a sleeve-like construction, the effect of perspective on the shape of the opening(s) is not shown in the figures and the proportions are changed for the sake of clarity.

In FIG. 4a, the control valve 1 has one opening 5, wherein the cross-sectional area of the opening 5 in the direction of the longitudinal axis 9 of the control valve 1, in other words, seen in a radial direction of the control valve 1 from the outside of the control valve 1 towards the longitudinal axis 9, comprises a circular shape.

In FIG. 4b, the control valve 1 includes a plurality of such openings 5. Such a round opening 5 may be a borehole or other type of a hole, for example. At least some of the openings 5 have at least one wall, at least a part of which is not arranged in a direction parallel to a radial direction of the control valve 1 extending through the middle point 12 of the cross-section of the opening 5 on the outer circumference of the control valve 1.

In FIG. 4c, the cross-sectional area of the openings 5 in the direction of the longitudinal axis of the control valve 1, in other words, as seen in a radial direction of the control valve 1 from the outside of the control valve 1 towards the longitudinal axis 9, has a rectangular shape. In an embodiment, the control valve 1 may, for instance, include only one opening 5 with a cross-section of a different shape, such as an ellipse, a rectangle or a polygon, for example. Where the control valve 1 has a plurality of openings 5, they may all have a cross-section of the similar shape or the cross-sectional shapes of the openings 5 may vary. Similarly, the cross-sectional area of the openings 5 may vary.

In different embodiments, one, several or all of the openings may have at least one wall 8, 8a, 8c at least a part of which is not arranged in a direction parallel to a direction radial in relation to the longitudinal axis 9 of the control valve 1 and extending through the middle point 12 of the cross-section of the opening 5 on the outer circumference of the control valve 1. In embodiments where the control valve 1 has a plurality of openings 5, at least a group of the openings may be spaced along the circumference of the control valve in an annular manner, such as in FIG. 2.

According to an embodiment, the control valve may be a distribution valve and the at least one opening 5 may be arranged in such manner that during at least one work phase of the breaking device 2 and one position of a percussion piston 4 of the breaking device 2 pressure fluid is arranged to flow from inside of the control valve 1 to a discharge channel 11 through the opening 5.

According to another embodiment, the control valve 1 may have openings 5 other than the ones connecting the work chamber 10 to the discharge channel 11. In such an embodiment, the opening or openings 5 having at least one wall 8, 8a, 8c, at least a part of which is not arranged in a direction parallel to radial direction B of the control valve 1 extending through the middle point 12 of the cross section of the opening 5 on the outer circumference of the control valve 1 may comprise opening(s) connecting the work chamber 10 to the discharge channel 11, at least in one phase of the work cycle of the breaking device 2 and its percussion piston 4 and/or some other opening provided in the control valve 1 and extending from the inner surface 6 to the outer surface 7 of the control valve 1, in other words through the wall of the control valve 1. It should be appreciated that the at least one opening 5 does not have to be an opening connecting the work chamber 10 to the discharge channel 11 in all embodiments, but the rotational effect may be achieved using another such opening provided in the control valve 1 as well. However, the flow rate through the opening with the angled or other non-radial wall affects the moment rotating the control valve 1 and, thus, openings with a higher flow rate there through may be the best choice. Therefore, the openings 5 connecting the work chamber 10 and the discharge channel 11 are often a preferable choice.

FIGS. 5a, 5b and 5c illustrate schematically cross-sections of different embodiments of the control valve 1 along line A-A of FIGS. 1 and 2. FIGS. 5a and 5b illustrate embodiments having openings 5 of the type illustrated in FIG. 3a, but wherein the angle D is different, for instance approximately 20 to 25 degrees in FIG. 5a and approximately 38 to 42 degrees in FIG. 5b. FIG. 5c illustrates a plurality of openings 5, all of which are substantially similar to those of FIG. 3b and spaced along the circumference of the control valve 1 in an annular manner. Naturally, in a different embodiment only some of the openings 5 may have a wall at least a part of which is not arranged in radial direction of the control valve as described above.

Figure 6A:
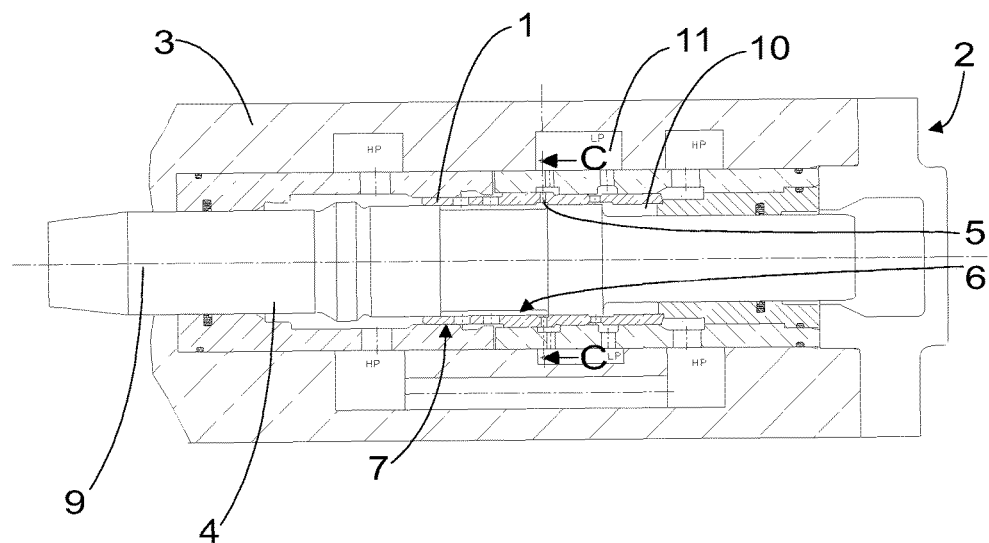
FIG. 6a is a partial cross-sectional view of a breaking.
Figure 6B:
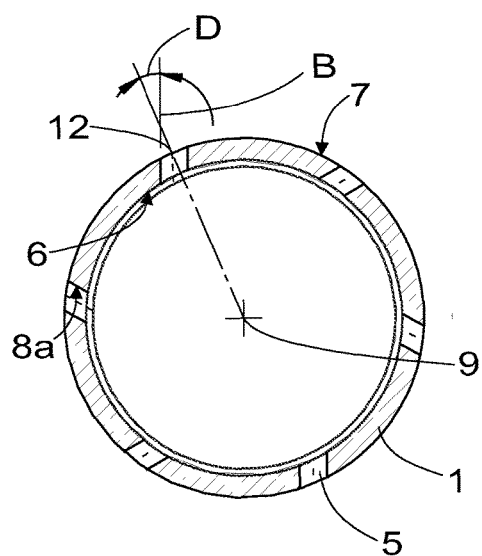

FIG. 6a illustrates schematically a detail of a breaking device, more particularly a rock drilling machine, as a partial cross-section and FIG. 6b illustrates schematically a cross-section of the control valve 1 along the line C-C of FIG. 6a. In the embodiment of FIGS. 6a and 6b at least one opening 5 of a different set of openings arranged in the control valve 1 has at least one wall 8, 8a, 8c that is not arranged in a direction parallel to a radial direction of the control valve 1 extending through the middle point 12 of the opening 5 on the outer circumference of the control valve 1. The pressure medium may be arranged to be pumped through this set of openings 5 in at least one phase of the work cycle of the percussion piston 4 and the control valve 1, more particularly, through the at least one opening comprising at least one wall 8, 8a, 8c at least a part of which is not arranged in a direction parallel to a radial direction of the control valve 1 extending through the middle point 12 of the opening 5 on the outer circumference of the control valve 1, to cause the control valve 1 to move in a rotational direction within the frame 3. Although only one embodiment of a possible cross-section is illustrated, one or more of the openings 5 in the set of openings may be similar to the openings 5 illustrated in FIGS. 3a, 3b, 3c, 4a, 4b and/or 4c, for example.

As described above, any opening 5 or any combination of openings 5 in the control valve 1 may include the at least one wall 8, 8a, 8c, at least a part of which is not arranged in a direction parallel to a radial direction of the control valve 1 extending through the middle point 12 of the opening 5 on the outer circumference of the control valve 1. As it is described in FIG. 5c, for example, only one or some of the openings in a set of openings spaced along the circumference of the control valve 1 may comprise such a wall. Also for other parts, the embodiments of FIGS. 6a and 6b may be similar to other embodiments described in this description or any combination thereof.

The number and spacing of the openings 5 in each one of the figures and embodiments is shown as an example only and different embodiments may have a different number of openings and/or sets of openings depending on the application. In some embodiments, also the direction of the angle D may be opposite to that shown in the figures, as long as the cross-sectional area of the opening on the inner surface is substantially equal to or larger than the cross-sectional area of the opening on the outer surface of the control valve such that the pressure fluid flowing through the opening may be arranged to rotate the control valve about the longitudinal axis of the control valve.

Also, the rotation speed caused by the wall at least a part of which is not arranged in a direction parallel to a radial direction of the control valve 1 extending through the middle point 12 of the opening 5 on the outer circumference of the control valve 1 is not limited, but even a rather slow and occasional rotational movement may be sufficient to avoid cavitation damages in some embodiments.

One benefit of the solutions described above is that the at least one wall 8, 8a, 8c of at least one opening 5 at least a part of which is arranged in a direction substantially different than a radial direction of the control valve is that the flow of the pressure fluid is bent. When said part of said wall forms a surface area when projected in the tangential direction of the control valve 1, this makes the control valve 1 to move in a rotational direction within the frame 3. This makes possible cavitation damages to spread over a considerably larger area on the inner surface 6 of the control valve 1, which lengthens the service life and the life cycle of the control valves considerably. Even very small moments, such as moments in the range of 1 Nm, may be enough to achieve a small rotation and even the interval of the rotational movements is usually not critical for the effect of spreading the area exposed to cavitation.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A control valve for controlling flow of a pressure fluid in a breaking device, comprising
   a sleeve shaped control valve arranged to control flow of the pressure fluid based on a percussion piston position, the valve including an outer surface, an inner surface; and
   at least one opening extending from the inner surface of the control valve to the outer surface of the control valve enabling flow of the pressure fluid between the inside of the control valve and the outside of the control valve through the at least one opening, wherein the at least one opening includes at least one wall, at least a part of which is not arranged in a direction parallel to a radial direction of the control valve extending through a middle point of a cross-section of the at least one opening on an outer circumference of the control valve, and wherein a cross-sectional area of the at least one opening on the inner surface is substantially equal to or larger than a cross-sectional area of the at least one opening on the outer surface of the control valve, such that the pressure fluid flowing through the at least one opening rotates the control valve about a longitudinal axis of the control valve.

2. A control valve according to claim 1, wherein the at least one wall having at least a part of which is not arranged in a direction parallel to a radial direction of the control valve extending through the middle point of the cross-section of the at least one opening on the outer circumference of the control valve is arranged at an angle in relation to said radial direction of the control valve.

3. A control valve according to claim 2, wherein the angle is between 5 degrees and 60 degrees.

4. A control valve according to claim 3, wherein the angle is between 15 degrees and 45 degrees.

5. A control valve according to the claim 1, wherein the at least one wall that is not arranged in a direction parallel to a radial direction of the control valve extending through the middle point of the cross-section of the opening on the outer circumference of the control valve has a step shape.

6. A control valve as claimed in claim 1, wherein the cross-sectional area of the at least one opening in the direction from the outside of the control valve towards the longitudinal axis of the control valve has a circular shape.

7. A control valve as claimed in claim 1, wherein the cross-sectional area of the opening in the direction from the outside of the control valve towards the longitudinal axis of the control valve has a rectangular shape.

8. A control valve as claimed in claim 1, wherein the at least one opening comprises a plurality of openings extending from the inner surface of the control valve to the outer surface of the control valve enabling flow of the pressure fluid between the inside of the control valve and the outside of the control valve, and wherein at least some of the openings have at least one wall that is not arranged in a direction parallel to a radial direction of the control valve extending through the middle point of the cross-section of the opening on the outer circumference of the control valve.

9. A control valve according to claim 8, wherein at least a group of the openings are spaced along the circumference of the control valve in an annular manner and wherein all the openings in the group include at least one wall that is not arranged in a direction parallel to a radial direction of the control valve extending through the middle point of the cross-section of the opening on the outer circumference of the control valve.

10. A breaking device comprising a control valve as claimed in claim 1, wherein the control valve is a distribution valve and wherein the at least one opening is arranged such that during at least one phase of the breaking device and one position of the piston of the breaking device pressure fluid flows from inside of the control valve to a discharge channel through the opening.

11. A rock drilling machine, comprising:
a percussion piston; and
a sleeve shaped control valve arranged to control flow of a pressure fluid based on a position of the percussion piston, the valve having an outer surface, an inner surface and at least one opening extending from the inner surface of the control valve to the outer surface of the control valve enabling flow of pressure fluid between the inside of the control valve and the outside of the control valve through the at least one opening, wherein the at least one opening includes at least one wall, at least a part of which is not arranged in a direction parallel to a radial direction of the control valve extending through a middle point of a cross-section of the at least one opening on an outer circumference of the control valve, and wherein a cross-sectional area of the at least one opening on the inner surface is substantially equal to or larger than a cross-sectional area of the at least one opening on the outer surface of the control valve, such that the pressure fluid flowing through the at least one opening rotates the control valve about a longitudinal axis of the control valve.

12. A breaking hammer, comprising:
a percussion piston; and
a sleeve shaped control valve arranged to control flow of the pressure fluid based on a position of the percussion piston, the valve having an outer surface, an inner surface and at least one opening extending from the inner surface of the control valve to the outer surface of the control valve enabling flow of pressure fluid between the inside of the control valve and the outside of the control valve through the at least one opening, wherein the at least one opening includes at least one wall, at least a part of which is not arranged in a direction parallel to a radial direction of the control valve extending through a middle point of a cross-section of the at least one opening on an outer circumference of the control valve, and wherein a cross-sectional area of the at least one opening on the inner surface is substantially equal to or larger than a cross-sectional area of the at least one opening on the outer surface of the control valve, such that the pressure fluid flowing through the at least one opening rotates the control valve about a longitudinal axis of the control valve.

* * * * *